United States Patent [19]

Sullivan, III

[11] Patent Number: 4,592,291

[45] Date of Patent: Jun. 3, 1986

[54] SEWAGE TREATMENT METHOD AND APPARATUS

[75] Inventor: Dennis W. Sullivan, III, New Iberia, La.

[73] Assignee: Red Fox Industries, Inc., New Iberia, La.

[21] Appl. No.: 710,498

[22] Filed: Mar. 11, 1985

[51] Int. Cl.⁴ .............................................. F23G 7/04
[52] U.S. Cl. .......................................... 110/346; 34/1;
  110/221; 110/224; 110/228; 110/238; 204/149
[58] Field of Search ............... 110/221, 224, 228, 238,
  110/346; 34/1, 4; 204/149

[56] References Cited

U.S. PATENT DOCUMENTS

| 4,121,349 | 10/1978 | Maffet | 110/224 X |
| 4,361,100 | 11/1982 | Hinger | 110/238 |
| 4,438,706 | 3/1984 | Boday et al. | 110/238 |
| 4,453,476 | 6/1984 | Erlandsson | 110/346 |

*Primary Examiner*—Edward G. Favors
*Attorney, Agent, or Firm*—Guy E. Matthews

[57] ABSTRACT

Method and apparatus for treating sewage to reduce total solids content. Involves separating sewage sludge from sewage liquid, dewatering and compressing the sludge, subjecting the sludge to microwave radiation to reduce sludge to ash-like residue, and adding the residue back to the sewage liquid. Optionally, to sterilize the sludge liquid with chemicals or ultraviolet light.

20 Claims, 6 Drawing Figures

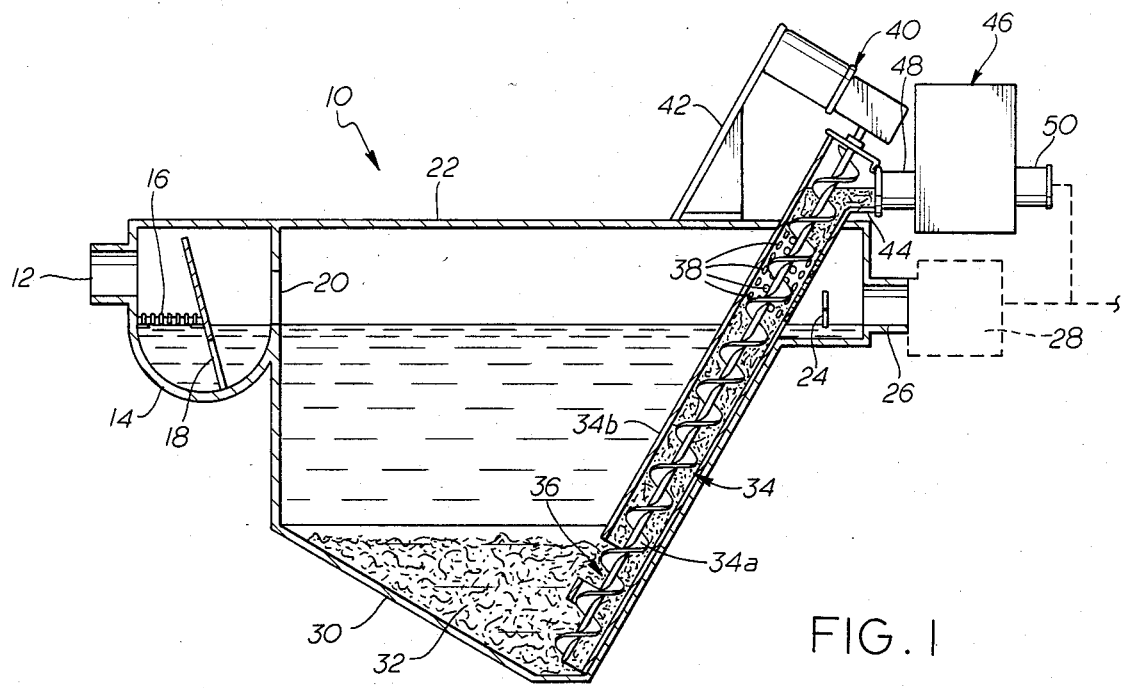
FIG. 1
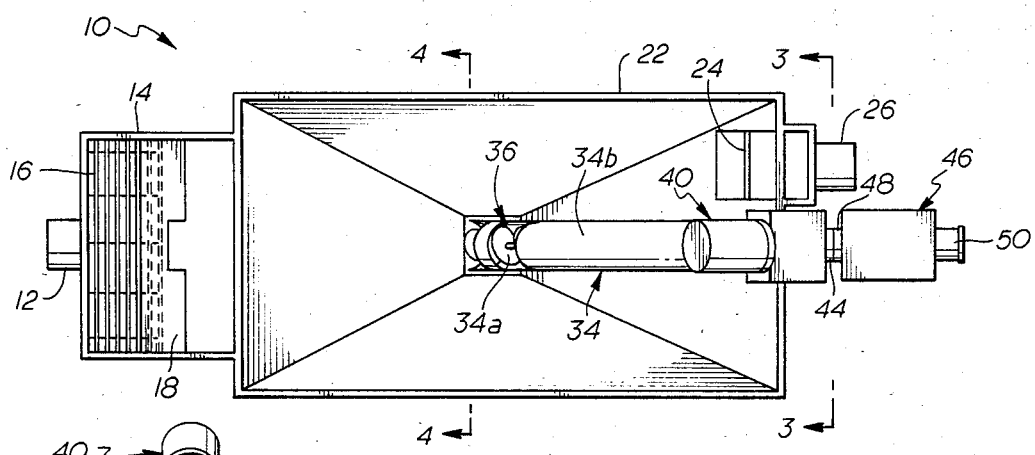
FIG. 2
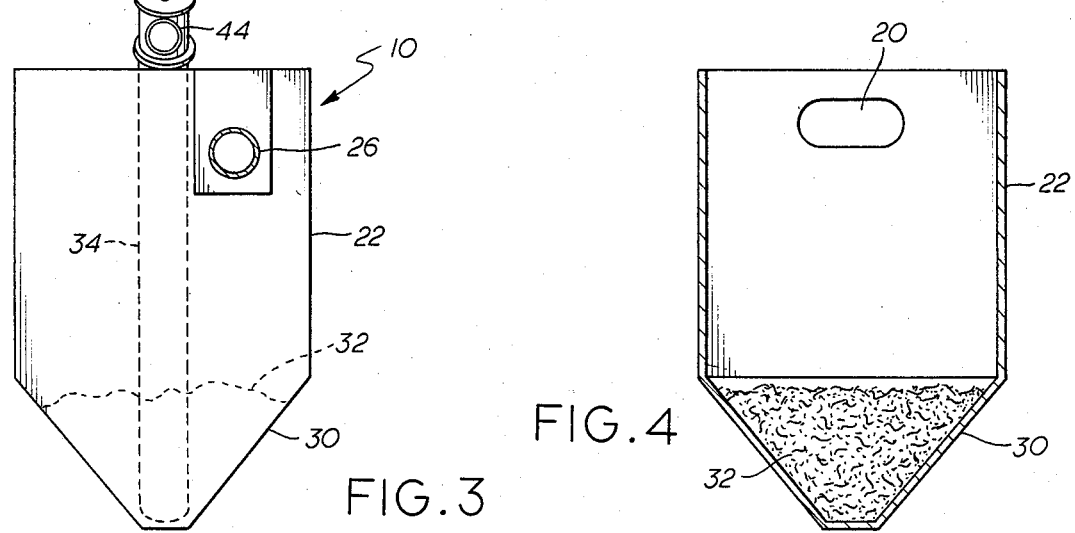
FIG. 3
FIG. 4

SEWAGE TREATMENT METHOD AND APPARATUS

This invention generally pertains to treating sewage effluents and more particularly to reducing the solids content of such effluents.

BACKGROUND OF THE INVENTION

As will be seen in the literature, there has been considerable work in the general area of eliminating waste products through incineration, pyrolyzation and the like.

There is also some prior art more pertinent to the present invention in the sense that the references contain information which may suggest additional applications and uses for the present invention.

These references are U.S. Patents to Smith U.S. Pat. No. 3,528,179; Barnet et al U.S. Pat. No. 3,775,860; Stribling U.S. Pat. No. 3,831,288; Levinson U.S. Pat. No. 4,103,431; Marincek U.S. Pat. No. 4,044,696; and Saito et al U.S. Pat. No. 4,223,448. This group of references is hereby incorporated by reference as part of this specification. The National Association and Space Administration has done some work pertaining to sewage incineration and pyrolization and published informal bulletins from time to time.

The principle accomplishment of the present invention is to remove or substantially reduce the solids content of raw domestic sewage. The particulate solids in such sewage is mostly organic in nature such as fibers, brans, lint and the like. If such sludge is incinerated or pyrolyzed, the resulting ash-like residue is only a very small proportion of the original organic solids.

OBJECTS OF THE INVENTION

The principle object of the present invention is to reduce the total solids content of a raw domestic sewage.

Another object of the present invention is to sterilize the sewage during treatment to the point where the sewage contains no measurable 5-day biochemical oxygen demand.

Yet another object of the present invention is to reduce the total solids content of such domestic sewage to where the total suspended solids content is under 15 parts per million (ppm).

SUMMARY OF THE INVENTION

This invention includes the method and apparatus for treating sewage to reduce the total solids content thereof. The invention involves steps and apparatus for separating sewage sludge from sewage liquid. The sludge is next compressed and dewatered to reduce its water content. The sludge is then passed through a reaction device where an endothermic reaction is induced by microwave radiation into the reaction chamber from all directions which successively dehydrates, heats and pyrolyzes the sludge into an ash-like residue which is only a small percentage in volume and weight of the original organic sludge material. The separated sewage liquid maybe sterilized through the application of chemicals or ultraviolet light as an optional step. The ash-like residue is of course sterilized during the pyrolysis.

IN THE DRAWINGS

FIG. 1 is a schematic cross-sectional view of the treating apparatus taken along its length.

FIG. 2 is a plan view of the apparatus of FIG. 1.

FIG. 3 is a side elevational view of the apparatus of FIG. 1 looking into the outlet passages.

FIG. 4 is a sectional view taken at section 4—4 and showing the passageways between adjacent chambers of the apparatus.

Detailed Description of the Preferred Embodiment

Figure 5:
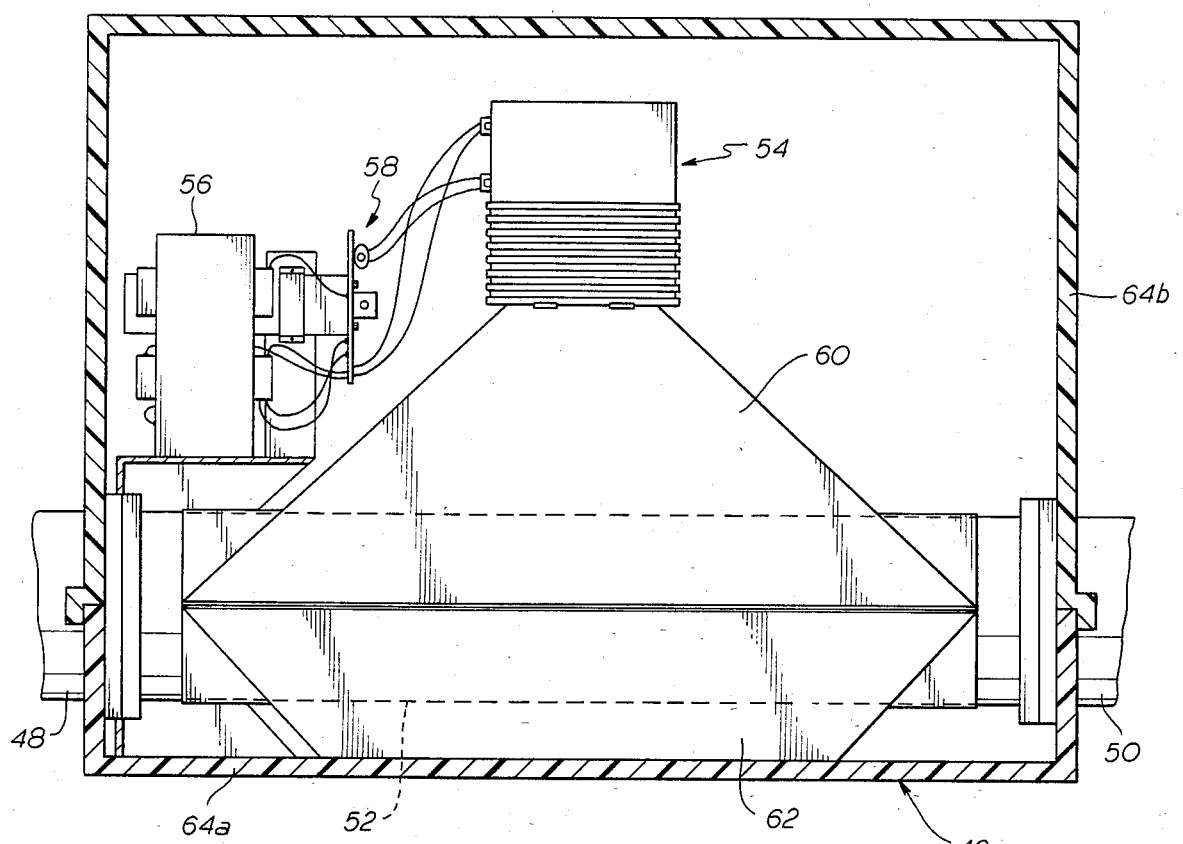
FIG. 5 is a side partly sectional view of the reactor assembly and magnetron generator of the present invention.

Referring now to FIGS. 1-4 the drawing shows the treatment apparatus 10 of the present invention which may be fabricated mostly of plastic such as Marlex-CL100, as marketed by the Phillips Petroleum Co.

Apparatus 10 includes a screening/degreasing chamber 14 having an inlet passage 12 and an exit passageway 20. Mounted in chamber 14 as shown is a screen 16 and a degreasing baffle 18. The screen 16 is preferably furnished in fiberglass and the degreasing baffle 18 may be the Marlex-CL100 plastic product previously mentioned.

Treatment apparatus 10 also has defined therein a separation chamber 22 as shown where the sewage stock enters through the passageway 20 and expands into the relatively large and quiet separation chamber. In the chamber 22, the sewage reaches substantial quisence and the particulate solids settle into a sludge at the bottom of chamber 22 where it is concentrated by a hopper-like bottom 30 as shown.

In separation chamber 22, the raw sewage is separated into two components: (1) a mostly organic sewage sludge 32 as shown in FIG. 1; and (2) a substantially clear sewage liquid which gradually flows on out of the chamber 22 through the outlet passageway 26. The liquid sewage discharge is comprised mostly of water and water soluble products such as salt and the like, for example.

A conveying means 34 is mounted to extend from the bottom of the hopper 30 up along a side of chamber 22 and out of the chamber to an exit passageway 44. The preferred embodiment of the conveying means 34 such as used in this invention is a helical screw conveyor, which includes a screw 34a rotatable within a housing 34b such as manufactured by the Link Belt Co.

The bottom of the conveyor 44 has entry ports 36 into which the sludge 32 can ooze to be picked up by the screw 34a and carried upwardly into the exit passageway 44.

About the upper one-fourth of the conveyor housing 34b is shown with a plurality of small holes or perforations 38 through which water may be pressed out of the sludge to run back into the separating chamber 22. The helical screw 34a can cooperatively be of closer pitch into and through the perforated area so as to compress the sludge as it is carried along by the screw and to thereby extract more water from the sludge.

The screw 34a of the screw conveyor 34 is driven by an electrically powered gear reduction unit 40 such that the screw 34a may turn very slowly, for example in the range of 0.5 to 10 rpm.

The outlet 44 of the conveyor 34 is connected into the inlet 48 of a reactor 46.

The inlet 48 is connected through the passageway of a reaction chamber 52 to an outlet 50.

The reaction chamber 52 is provided as a ceramic tubular member where the raw sewage sludge is brought in for treatment as later described.

Surrounding the chamber 52 is an array of wave guide plates 60 and baffle plates 62 which serve to completely enclose and direct microwaves into the product contained within the reaction chamber 52. As shown, the microwaves are generated by a magnetron generator 54 such as a General Electric - WB27X5142 which is powered through an electrical driving system 58 and a transformer 56 such as a G.E. WD27X5096.

The reaction chamber 52 and magnetron apparatus 54-62 is housed within a housing enclosure 64 comprising a base 64a and a cover 64b such enclosure is also made desirably with the Marlex-CL100 plastic product previously mentioned.

OPERATION OF THE PREFERRED EMBODIMENT

In operation of the apparatus 10 as shown raw domestic sewage is introduced first through passageway 12 into the screening/degreasing chamber 14. The sewage is passed through the screen 16 and around the degreasing baffle 18 through the passageway 20 into the settling chamber 22.

In chamber 22 the sewage expands to a quiescent stage. While the sewage is quiescent the particulated organic solids begin to precipitate from the sewage to form an organic particulate sewage sludge 32 which collects in the converging sides of the hopper-like bottom 30 as shown.

The clarified liquid sewage at the top of the chamber 22 slowly flows past a baffle 24 and out the outlet passageway 26.

As an optional treatment to the liquid sewage passing from passageway 26 the sewage may enter into a sterilization unit 28 indicated in dashed lines where it can be sterilized through application of chemicals or ultraviolet light.

Referring now to the conveyor 34, inlet ports 36 are provided in the housing 34b where the semi-solid sewage sludge 32 may ooze into and around the screw 34a.

Rotation of screw 34a will transport the sludge 32 upwardly out of the chamber 22 and subsequently out of the conveyor outlet 44. In the upper quadrant or thereabouts of the screw 34a in the conveyor housing 34b are an array of perforations 38 each being about $\frac{1}{4}''$ in diameter, for example. Rotation of the screw 34a tends to compress the sludge 32. The screw 34a optionally may decrease in pitch before and through the interval of perforations so as to further compress the sludge 32 and thereby to extract as much water as possible from the sludge 32 before it is pushed out of the outlet passageway 34 into the reactor 46 as described.

The sludge 32 is pushed out the conveyor 34 by the screw 34a into the inlet 48 of reactor 46 and thereon into the reaction chamber 52 of the reactor 46.

Figure 6:
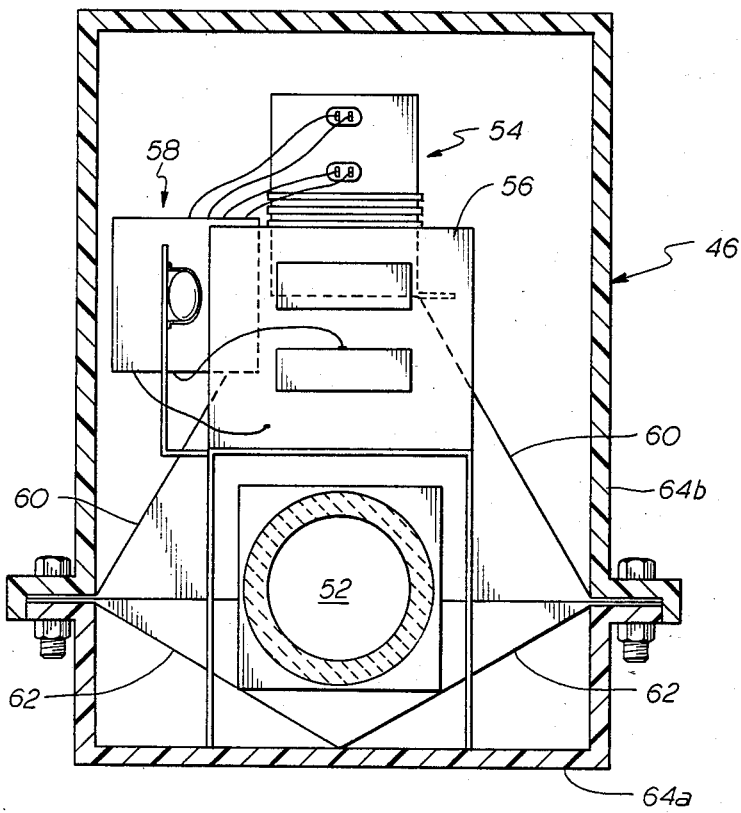
FIG. 6 is a partly sectional end view of the reactor and magnetron assembly of FIG. 5.

The reaction chamber 52 is completely subjected to high frequency microwaves from all round which are guided into the reaction chamber 52 by the array of baffle plates 62 and wave guide plates 60 from the magnetron microwave generator 54 as shown in FIGS. 5 and 6.

The sewage sludge 32 being subjected to the microwave energy begins an endothermic heat reaction caused by the molecular acceleration in the organic material which is induced by the microwave radiation. Intially this reaction serves to drive out the remaining water in the sludge and thereafter to subject the sludge particulates to a pyrolytic reaction which ultimately reduces the particulates into an ash-like residue. Such residue is of a volume and weight which is only a very small percentage of that of the original sludge and organic particulates.

The residue coming out of the outlet 50 of the reactor 46 may be returned, as indicated by dashed lines, into the liquid sewage which is coming out of the chamber 22 and optionally through a sterilizer 28, also shown in dashed lines.

The resulting treated sewage, which includes the residue from the reactor 46 and the liquid sewage from the sterilizer 28, should contain no measurable 5-day biochemical oxygen demand and should have a total suspended solids content of less than about 15 ppm.

While certain specific aspects and embodiments of the present apparatus and method have been set out in detail in this specification, it will be understood that such is intended to be illustrative and not limiting and that the invention is to be defined by the scope of the appended claims.

What is claimed is:

1. A method of treating sewage effluent to reduce total suspended solids content, comprising:
    (a) passing the sewage through settling chamber means to cause separation of the sewage into a sewage sludge consisting of water and particulate solids components and a sewage liquid consisting of water and dissolved components;
    (b) conveying the sewage sludge through a compression and dewatering step to increase the solids concentration in the sewage sludge;
    (c) subjecting the sewage sludge to microwaves guided into the sewage sludge by wave guiding and shielding means from magnetron means wherein the remaining water is removed from the sewage sludge to leave particulates and wherein the particulates are then pyrolized into a particulated ash-like residue; and
    (d) mixing the sludge residues into the sewage liquid to form a treated sewage.

2. The method of claim 1 further including the steps of first screening the sewage to remove floating detritus and degreasing the sewage to remove grease.

3. The method of claim 1 further including the step of sterilizing the sewage liquid after its separation to form a treated sewage with the characteristics of having no measurable 5-day oxygen demand and a total suspended solids content of less than fifteen parts per million.

4. The method of claim 1, wherein the compression and dewatering step is performed by conveying means bringing the sewage sludge from the settling chamber means into a generally cylindrical endothermic reactor means.

5. The method of claim 1 further including the steps of first screening the sewage to remove floating detritus and degreasing the sewage to remove grease; sterilizing the sewage liquid after its separation to form a treated sewage having the characteristic of having no measurable 5-day oxygen demand; and wherein the compression and dewatering step is performed by conveying means bringing the sewage sludge from the settling chamber means into a generally cylindrical endothermic reactor means.

6. Apparatus for treating sewage effluent to reduce total suspended solids content comprising:
(a) means for passing the sewage through settling chamber means to cause separation of the sewage into a sewage sludge consisting of water and particulate solids components and a sewage liquid consisting of water and dissolved components;
(b) means for conveying the sewage sludge through a compression and dewatering means to increase the solids concentration in the sewage sludge;
(c) means for subjecting the sewage sludge to microwaves guided into the sewage sludge by wave guiding and shielding means from magnetron means wherein the remaining water is removed from the sewage sludge to leave particulates and wherein the particulates are then pyrolized into a particulated ash-like sludge residue; and
(d) means for mixing the sludge residues into the sewage liquid to form a treated sewage having the characterization of including a very minor total suspended solids content.

7. The apparatus of claim 6, further including means for first screening the sewage to remove floating detritus and means for degreasing the sewage to remove grease.

8. The apparatus of claim 6 further including means for sterilizing the sewage liquid after its separation to form a treated sewage having the characteristic of having no measurable 5-day oxygen demand.

9. The apparatus of claim 6, wherein the compression and dewatering means is included in conveying means for bringing the sewage sludge from the settling chamber means into a generally cylindrical endothermic reactor means.

10. The apparatus of claim 6 further including the means for first screening the sewage to remove floating detritus, means for degreasing the sewage to remove grease; means for sterilizing the sewage liquid after its separation to form a treated sewage having the characteristic of having no measurable 5-day oxygen demand; and wherein means is included in said conveying means for bringing the sewage sludge from the settling chamber means into a generally cylindrical endothermic reactor means.

11. In apparatus for treating sewage effluent to reduce its total solids content, the combination comprising:
(a) a composite containment structure;
(b) a settling chamber defined by said structure to be of volume and configuration selected to permit sewage effluent passed through said chamber to reach sufficient quiescence for the particulated solids to settle out of said effluent with said solids forming a sludge within the bottom of said chamber and the remaining said effluent passing out of said chabmer as substantially clear sewage liquid containing only dissolved components;
(c) a conveyor means for removing said sewage sludge from the bottom of said chamber out of said chamber through an outlet located above the liquid level within said chamber; and,
(d) a microwave energized endothermic reactor means for pyrolizing the sewage sludge received from said conveyor means to convert said sludge into a dry ash-like residue.

12. The apparatus of claim 11 also including a pretreating chamber defined by said structure, said pretreating chamber including means for screening and degreasing the sewage effluent which is to be passed into said settling chamber.

13. The apparatus of claim 11 wherein the bottom of said settling chamber is defined as a hopper shape converging at the entry of said conveyor means.

14. The apparatus of claim 11 including dewatering means incorporated with said conveyor means to compress said sewage sludge being conveyed and thereby remove excess liquid.

15. The apparatus of claim 11 wherein said conveyor means is a helical screw conveyor.

16. The apparatus of claim 14 wherein said dewatering means comprises a reduced pitch in the helical screw of a helical screw conveyor through a zone where drain holes are defined by the housing walls of said screw conveyor.

17. The apparatus of claim 11 wherein said reactor means comprises (a) a ceramic reaction passageway; (b) a magnetion microwave generator directed toward said reaction passageway; and (c) wave guide and baffle means disposed about said reaction passageway to direct microwaves from said magnetron into said passageway from all around said passageway.

18. The apparatus of claim 11 including means for returning said residue into said liquid sewage with the resulting mixture having a very minor total solids content.

19. The apparatus of claim 18 further including means to sterilize said liquid sewage to the characteristic of having no measurable oxygen demand.

20. The apparatus of claim 17 wherein said conveyor means comprises a helical screw conveyor through a zone where drain holes are defined by the housing walls of said screw conveyor.

* * * * *